(No Model.)
J. W. HALEY & D. H. TUTTLE.
BALL.
No. 563,170.　　　　　　　　　　Patented June 30, 1896.
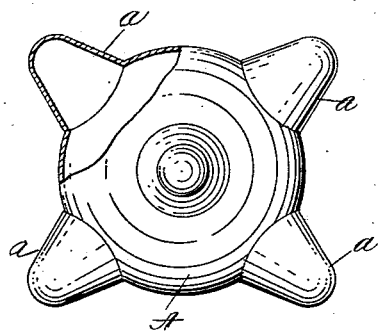
WITNESS:
INVENTORS
ATTORNEYS.

UNITED STATES PATENT OFFICE.

JAMES WILLIAM HALEY AND DAVID H. TUTTLE, OF NEW YORK, N. Y.

BALL.

SPECIFICATION forming part of Letters Patent No. 563,170, dated June 30, 1896.

Application filed April 13, 1896. Serial No. 587,290. (No model.)

*To all whom it may concern:*

Be it known that we, JAMES WILLIAM HALEY and DAVID H. TUTTLE, citizens of the United States, and residents of New York, in the county of New York and State of New York, have invented certain new and useful Improvements in Balls, of which the following is a specification, reference being had to the accompanying drawing, forming a part thereof, in which similar letters of reference indicate corresponding parts.

This invention relates to balls; and the object thereof is to provide a device of this class which is intended for the amusement of children and others; and the invention consists in the combination, with an ordinary hollow elastic or rubber ball, of a plurality of conical projections whereby the ball when it strikes the ground or other object or surface may be caused to rebound in a number of directions, the direction taken depending upon the position of the ball when it strikes.

The invention is fully disclosed in the following specification, of which the accompanying drawing forms a part, said drawing being a side view of our improved ball, a part thereof being shown in section.

In the practice of our invention we provide a ball A, which is hollow and which is composed of soft rubber, rubber and canvas, or of any similar material, and the ball A is provided with a plurality of hollow conical projections $a$, and which are preferably six in number, and five of which are shown. The projections $a$ are secured to, or formed integrally with, the ball, and the space therein communicates with the hollow space within the ball; but this feature of construction is not essential to our improvement, and said ball and said projections may be made of solid rubber if preferred.

The ball A, when provided with the projections $a$, will always strike when thrown upon one, two, or three of said projections, and the direction of the rebound will depend upon the position of the ball when it strikes the object at which it is thrown or on which it falls; and it will thus be apparent that the ball may be caused to take a great variety of directions when rebounding, and will scarcely, if ever, rebound in a straight line, or to the point from which it is thrown.

Our invention is not limited to the material of which the ball is composed, and we reserve the right to make all such alterations therein and modifications thereof as fairly come within the scope of the invention.

Having fully described our invention, we claim as new and desire to secure by Letters Patent—

1. A hollow elastic ball provided with a plurality of conical projections, substantially as shown and described.

2. A hollow elastic ball, provided with a plurality of projections which are also hollow, substantially as shown and described.

In testimony that we claim the foregoing as our invention we have signed our names, in presence of the subscribing witnesses, this 6th day of April, 1896.

JAMES WILLIAM HALEY.
DAVID H. TUTTLE.

Witnesses:
C. GERST,
A. C. McLOUGHLIN.